United States Patent

Hordnes et al.

[11] Patent Number: 5,445,036
[45] Date of Patent: Aug. 29, 1995

[54] TORQUE SENSOR

[75] Inventors: Ivar Hordnes, Vancouver; Andre C. Bidaud, Burnaby; Sheldon I. Green, Vancouver, all of Canada

[73] Assignee: The University of British Columbia, Vancouver, Canada

[21] Appl. No.: 260,442

[22] Filed: Jun. 15, 1994

[51] Int. Cl.⁶ .................................................. G01L 3/02
[52] U.S. Cl. ............................ 73/862.321; 73/862.322; 73/862.325
[58] Field of Search ............... 73/862.321, 862.322, 73/862.325, 862.49

[56] References Cited

U.S. PATENT DOCUMENTS

| | | | |
|---|---|---|---|
| 670,324 | 3/1901 | Venerkus | 73/862.322 |
| 2,535,667 | 12/1950 | Burger et al. | 73/862.338 |
| 2,563,425 | 8/1951 | Schaevitz | 73/862.338 |
| 3,813,933 | 6/1974 | Weiss et al. | 73/862.325 |
| 3,851,525 | 12/1974 | Parkinson | 73/862.49 |
| 3,956,930 | 5/1976 | Shoberg | 73/862.045 |
| 4,297,877 | 11/1981 | Stahl | 73/862.338 X |
| 4,555,956 | 12/1985 | Reich | 73/862.321 |
| 4,723,450 | 2/1988 | Coulter | 73/862.191 |
| 4,754,652 | 7/1988 | Coulter | 73/862.191 |
| 4,765,191 | 8/1988 | Kume | 73/862.195 |
| 4,809,557 | 3/1989 | Maurer et al. | 73/862.322 |
| 5,058,438 | 10/1991 | Timtner | 73/862.322 |
| 5,133,216 | 7/1992 | Bridges | 73/862.321 |
| 5,165,288 | 11/1992 | Timtner | 73/862.325 X |
| 5,195,383 | 3/1993 | Tanara et al. | 73/862.325 |

*Primary Examiner*—Richard Chilcot
*Assistant Examiner*—Elizabeth L. Dougherty
*Attorney, Agent, or Firm*—C. A. Rowley

[57] ABSTRACT

A torque sensing system is provided in a coupling connecting a drive and driven shaft by tension members that transmit torque from one shaft to the other through tension in the tension members at least one of which is provided with a sensor to sense the tensile stress in one of the members and to provide a signal indicating the tension (torque) applied through the tension members. If desired, an axially extending column element may be positioned between the two shafts to absorb axial thrust of between the shafts and a second sensor sensing the stress in the column may be used to determine thrust substantially independent of torque. The system may be used to detect off-axis loads.

9 Claims, 2 Drawing Sheets

TORQUE SENSOR

FIELD OF THE INVENTION

The present invention relates to a torque sensor, particularly a torque sensor that senses torque and/or thrust independently.

BACKGROUND OF THE PRESENT INVENTION

Sensing torque and/or thrust in a shaft, particularly in larger drive shafts, for example, in marine drives, wherein the drive shaft is also subjected to a significant amount of thrust, generally results in the torque reading being colored by the degree of thrusts applied to the shaft or vice versa. In this and other applications it is sometimes desirable to obtain an accurate reading of torque independent of thrust, but there are few if any sensor systems capable of so selecting.

It is known to detect torque by sensing the pressure between gear teeth for example, i.e. sensing the pressure or compression between the teeth, however, this is not particularly satisfactory.

It is also known to provide torque sensing elements in a coupling to measure the pressure through the drive connection to define the torque see U.S. Pat. No. 3,813,933 issued Jun. 4, 1974 to Weiss et al.; and U.S. Pat. No. 4,723,450 issued Feb. 9, 1988 and U.S. Pat. No. 4,754,652 issued Jul. 5, 1988 both to Coulter.

U.S. Pat. No. 4,765,191 issued Aug. 23, 1988 to Kume describes a system wherein the tightening of a threaded connection through which thrust is transmitted axially displaces an element and by monitoring the axial displacement the transmitted torque is assessed or measured.

U.S. Pat. No. 3,956,930 issued May 18, 1976 describes a drive system wherein a universal joint type structure wherein the cross elements are replaced with a integral ring shaped body through which the torque is transmitted and which functions as a force transducer. The integral struts are provided with strain sensors that senses the strain in the struts to provide an indication of the torque being transmitted.

BRIEF DESCRIPTION OF THE PRESENT INVENTION

It is the object of the present invention to provide a torque sensor for sensing torque substantially independent of thrust, more particularly, it is an object of the present invention to provide such a system that avoids distortion of the torque measurement by measuring tension in a member not subjected to other loading.

It is a further object to provide a system of measuring thrust independent of torque.

Broadly, the present invention relates to a torque sensing system comprising a coupling means having a first face plate and a second face plate means mounting said first and second plates for rotation, said coupling means including link means interconnecting said first and second plates, first connecting means connecting said link means adjacent to one end of said link means to said one plate and second connecting means connecting said link means adjacent to the other end of said link means remote from said one end to said second plate, said first and said second connecting means connecting said link means to said first and said second plates at locations radially offset from their axes of rotation thereby positioning said link means relative to said axes to transfer torque in one direction from first plate to said second plate substantially solely through tension in said link means and a sensor means for sensing tension in said link means.

Preferably, said link means will include a plurality of separate links circumferentially positioned about said axes, each of said links having its respective said first and second connecting means.

Preferably, each said link will be made from the same material and will have same cross-sectional area.

Preferably said sensor means also senses compression in said link means when said torque is transferred in a direction opposite to said one direction.

Preferably, said coupling means will further include a thrust transmitting means for transmitting axial thrust substantially axially relative to said axes between said first and said second plate and means for measuring the thrust transmitted by said thrust transmitting member.

Preferably, said thrust transmitting member will have a preselected cross-sectional area.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
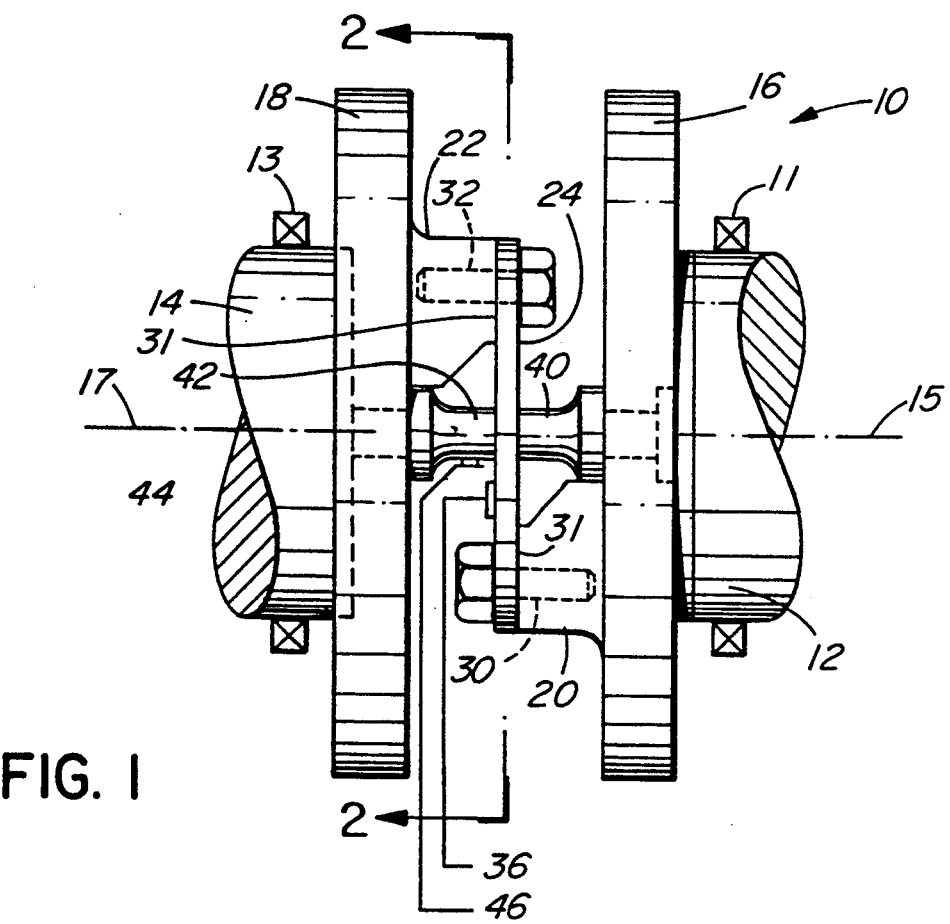
FIG. 1 is a side elevation illustrating the constructing of the torque sensor of the present invention.
Figure 2:
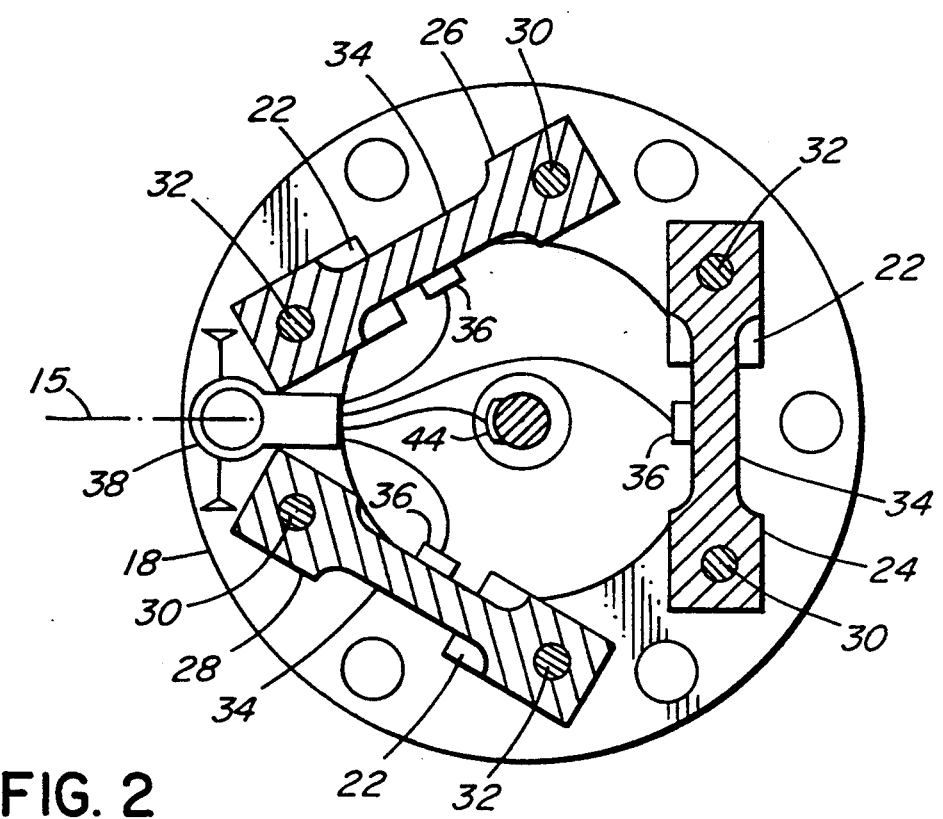
FIG. 2 is a section along the line 2—2 of FIG. 1.

The torque measuring system of the present invention comprises a coupling 10 interconnecting a first shaft 12 and a second shaft 14 mounted on bearings schematically indicated at 11 and 13 to rotate about axes 15 and 17 respectively, which generally will be coaxial (as will be described below the coupling 10 may transmit torque between angularly offset axes and detect the angular offset.). The coupling 10 includes a first flange forming a first face plate 16 fixed to the shaft 12 and a second flange forming a second face plate 18 is fixed to the shaft 14 by any suitable means (not shown). The flanges 16 and 18 are essentially the same, with mounting blocks 20 fixed to the flange 16 and mounting blocks 22 essentially the same as blocks 20 fixed to the flange 18 by any suitable means such as welding.

Tension link (3 shown in the illustrated arrangement, indicated at 24, 26 and 28) are each connected at one end via a connecting pin (bolts) 30 to the mounting blocks 20 on the flange 16 and at their other ends via connecting pins (bolts) 32 to mounting blocks 22 to the flange 18. It will be apparent that the use of discrete links connected only at their ends in the manner described the links may perform as essentially pure tension members.

Preferably, each of the links 24, 26 and 28 is necked down to provide a narrow or reduced cross-sectional bridging section 34 which will have a preselected cross sectional area so that for a given material the amount of deformation for a given tensile load can be accurately established. Preferably each of the links 24, 26 and 28 will have essentially the same cross-sectional area and each of the links 24, 26 and 28 will be made of the same materials so that the tensile strength of the links 24, 26 and 28 are all essentially the same.

Each of the links 24, 26 and 28 has been provided in the illustrated arrangement with a sensor 36. It is not essential that each link be provided with a sensor. In fact, a single sensor positioned on one of the links 24, 26 or 28 to sense the tension (or compression) stress along the link (depending on the drive direction) may be used to provide an accurate measurement of tension (or compression).

The stresses sensed by the sensors 36 are delivered to a suitable unit which may take the form of slip rings, or, as illustrated, a signal conditioning transmitter 38 that will convey the signal to a display and analyzing equipment as will be described below may be used.

Preferably the sensors 36 will be mounted on the links 24, 26 and/or 28 in a manner to optimize the detection of stress along the links i.e. detect stress along the line or axis interconnecting the pins 30 and 32 for the respective link.

Each of the links as above indicated are essentially the same cross-sectional area and thus have essentially the same tensile strength and thus, will distort essentially the same amount for a given torque (tension or compression) load.

Since, as above indicated, the opposite ends of each of the links 24, 26 and 28 are essentially free to pivot on their mounting pins 30 or 32, and since the axial facing surfaces 31 of the blocks 20 and 22 (surfaces facing the links 24, 26 and 28) preferably are spaced, preferably by a thrust transmitting member 40 as will be discussed below, to eliminate any normal bending load from being applied to the links 24, 26 or 28, substantially the only forces transmitted by the links 24, 26 and 28 are either tension or compression forces depending on the drive direction. These forces are derived substantially solely from the torque applied through the coupling 10. Thus measuring of the tension (or compression) of the links 24, 26 and/or 28 provides an accurate indication of the torque being transmitted.

While it is preferred, it is not essential, to construct the system so that the links are substantially free from bending stresses. If the links are to carry bending stresses the sensors 36, as is well known, may be designed and mounted to automatically compensate for bending stresses so that when the links 24, 26 and 28 are subjected to bending, the torque is still measured based on the sensed tension (or compression) in the links 24, 26 and/or 28.

The surfaces 31 may be positioned as above described to avoid bending stresses being applied to the links 24, 26 and 28, preferably, by a thrust absorbing column 40 that preferably is substantially co-axial with the axes 15 and 17 of first 12 and second 14 shafts and interposed between the flanges 16 and 18 to absorb any axial thrust therebetween. A suitable detector 44 senses the compression (or tension) stress in the column 40 to provide an accurate indication of the thrust substantially independent of torque.

This member 40 preferably is necked down as indicated at 42 so that the cross-sectional area of the member 40 in the area where the detector or sensor 44 is positioned so that the cross sectional are where the stress is detected is accurately defined. The thrust member 40, preferably has a substantially circular cross-section. While a single thrust column 40 is shown a number or such axial thrust columns preferably arranged symmetrically about the rotational axes 15 and 17 may be used.

It will be apparent that by changing the cross-sectional area of the necked down portion 42, the amount of distortion of the member 40 for a given load may be selectively adjusted, i.e. by substituting one member 40 of a given cross sectional area for another member 40 having a different cross-sectional area in the same manner as the links 24, 26 and 28 may be changed and ones of selected cross sectional area used depending on the expected torque, i.e. the cross sectional area of tension links 24, 26 and 28 or of the column 40 (portion 42) may be selected to provide the desired degree of stress distortion for a given load to provide more easily sensed (more accurate) measurement of the tension or compression (torque) in the links 24, 26 or 28 or of the tension or compression (thrust) in the column member 40. The detectors 36 or 44 may be positioned to be more sensitive to the loads to be detected and thereby be more sensitive based on the expected torsion or thrust between the two flanges 16 and 18 and by signal analysis aid in determining angular misalignment between the axes 15 and 17 of the shafts 12 and 14 respectively as will be described below.

It will be apparent that in the systems above described, the detectors 36 detect substantially only tension or compression of the members 24, 26 and/or 28 which are accurately related to the torque transmitted by the coupling 10, whereas the forces applied to the member 40 are substantially solely thrust forces applied axially of the drive, i.e. of the two shafts 12 and 14.

If there is a possibility that torque may be transmitted via the column 40, one axial end of the column may be supported by a thrust bearing permitting relative rotational movement between the column 40 and one of the shafts 12 or 14.

The signals from the sensors 36 and 44 may be delivered from the rotating coupling 10 by any suitable means.

Figure 3:
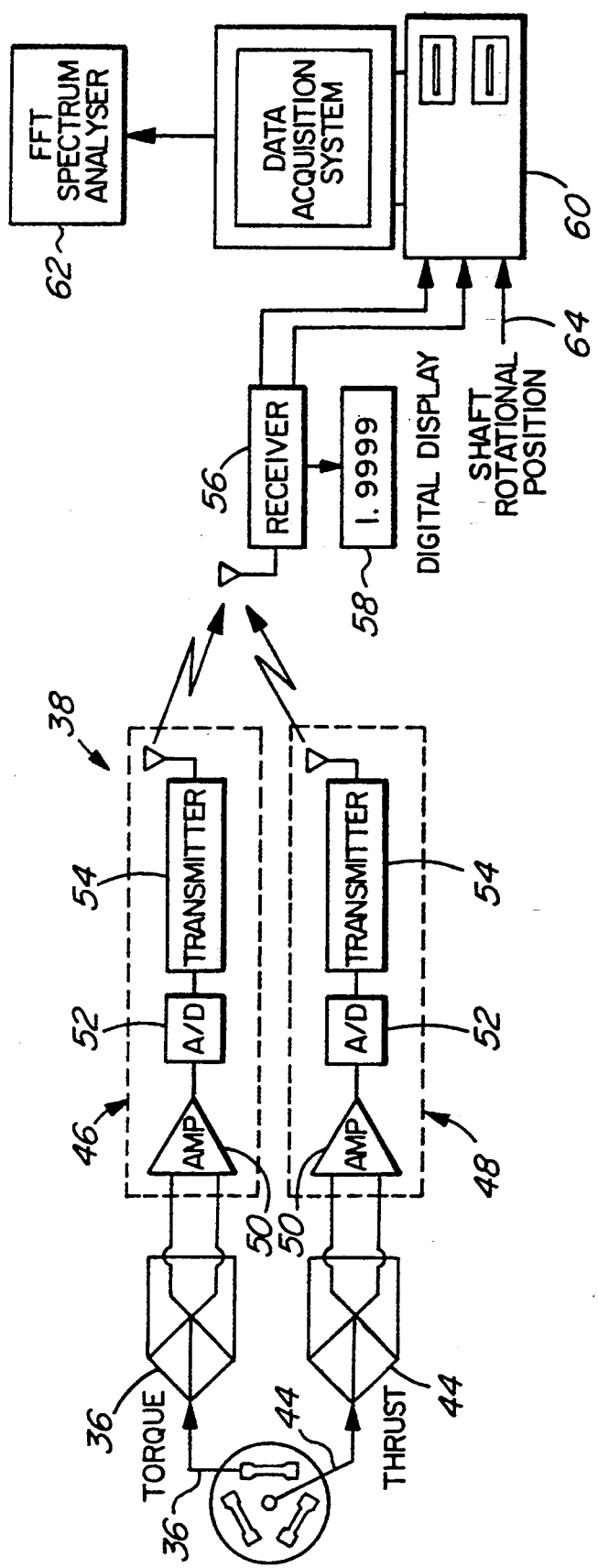
FIG. 3 is a schematic illustration of the measuring system of the present invention.

In the arrangement illustrated in FIG. 3 a transmitter system 38 has been used. In this arrangement the detectors 36 and 44, which preferably will be load cells, deliver electrical signals, based on the amount of stress to which it is subjected, to its respective transmitting systems 46 and 48. Each system 46 or 48 is composed of an amplifier 50, analog to digital converter 52, a transmitter 54 and a power supply (not shown) which broadcast the respective signals to a receiver 56. The received signal may be displayed as indicated by the display 58 and/or transmitted to a computer or the like 60 which may act as a data acquisition system and from which the acquired data may be used in any suitable selected manner, for example, it may be subject to a spectrum analyzer as indicated at 62.

While this data delivery system has been indicated as containing a transmitter 38 and receiver 56, etc., it will be apparent that the sensed data of tension and thrust (compression) may be delivered from the coupling 10 by any suitable means including slip rings. However, it is believed that the use of a transmitter may enhanced the operation of the equipment from an accuracy and convenience point of view.

The computer 60 and analyzer 62 may be used not only to determine the torque and thrust, but may also be used, by analyzing signal fluctuation, to determine off-axis loading auch as the angular misalignment of the two axes 15 and 17 and/or imbalance of the system. When detecting imbalance and/or angular misalignment the sensors used (36 or 44) must be positioned eccentric to (as opposed to axial of) the axes 15 and 17 to obtain the best reading and, it is preferred, to provide information of the angular position of the shafts 12 and 14 around their respective axes 15 and 17 as indicated schematically at 64 to the computer 60 and/or analyzer 62.

Having described the invention, modifications will be evident to those skilled in the art without departing from the scope of the invention as defined in the appended claims.

We claim:

1. A torque sensing system comprising a coupling means having a first face plate and a second face plate, means mounting said first and second plates for rotation, said coupling means including link means interconnecting said first and second plates, first connecting means connecting said link means adjacent to one end of said link means to said first plate and second connecting means connecting said link means adjacent to the other end of said link means remote from said one end to said second plate, said first and said second connecting means connecting said link means to said first and said second plates at locations radially offset from their axes of rotation thereby positioning said link means relative to said axes to transfer torque in one direction at a time between said first plate and said second plate substantially solely through tension in said link means and a sensor means for sensing tension in said link means and thrust transmitting means for transmitting axial thrust between said first and said second plates.

2. A torque sensing system as defined in claim 1 wherein said link means includes a plurality of separate links circumferentially positioned about said axes, each of said links having its respective said first and second connecting means.

3. A torque sensing system as defined in claim 2 wherein each said link is made from the same material and has the same preselected cross-sectional area.

4. A torque sensing system as defined in claim 3 wherein said sensor means also senses compression in said link means when said torque is transferred in a direction opposite to said one direction.

5. A torque sensing system as defined in claim 2 wherein said sensor means also senses compression in said link means when said torque is transferred in a direction opposite to said one direction.

6. A torque sensing system as defined in claim 1 wherein said sensor means also senses compression in said link means when said torque is transferred in a direction opposite to said one direction.

7. A torque sensing system as defined in claim 1 further comprising means for measuring thrust transmitted by said thrust transmitting member.

8. A torque sensing system as defined in claim 7 wherein said thrust transmitting means is substantially symmetrically positioned relative to said axes.

9. A torque sensing system as defined in claim 1 wherein said thrust transmitting means is substantially symmetrically positioned relative to said axes.

* * * * *